United States Patent [19]

Takasan et al.

[11] Patent Number: 5,937,977
[45] Date of Patent: Aug. 17, 1999

[54] NON-CONTACT POWER SUPPLY FOR CONVEYOR CARRIAGES

[75] Inventors: Masaki Takasan; Yasuharu Odachi, both of Kariya, Japan

[73] Assignee: Kabushiki Kaisha Toyoda Jidoshokki Seisakusho, Kariya, Japan

[21] Appl. No.: 08/998,408

[22] Filed: Dec. 24, 1997

[51] Int. Cl.⁶ ........................................... B60L 9/00
[52] U.S. Cl. .................................................. 191/10
[58] Field of Search ............................ 191/10; 307/9.1, 307/104; 340/310.07; 439/950; 455/41; 336/DIG. 2

[56] References Cited

FOREIGN PATENT DOCUMENTS

| | | |
|---|---|---|
| 5-336607 | 12/1993 | Japan . |
| 5-344603 | 12/1993 | Japan . |
| 9-011779 | 1/1997 | Japan . |
| 8-340603 | 12/1998 | Japan . |

*Primary Examiner*—Robert J. Oberleitner
*Assistant Examiner*—Robert J. McCarry, Jr.
*Attorney, Agent, or Firm*—Morgan & Finnegan, L.L.P.

[57] ABSTRACT

A non-contact power supply system for supplying electric current from a power supply unit to a carriage that travels along a rail. A pair of cables, which are used to convey electric current that drives the carriage, extend along the rail. Each cable has a first end connected to the first end of the other cable and a second end connected to the power supply unit. A plurality of brackets are located on the rail to support both cables. Each bracket has a pair of hangers projecting horizontally. The hangers each have distal ends for supporting the corresponding cables. A first type of bracket supports the first ends of both cables, and a second type of bracket supports the second ends of both cables. A jumper strap electrically connects the first ends to each other. The jumper strap extends between the distal ends of both hangers and conforms to the shape of a portion of the first bracket that lies in its path. The jumper strap is a thin belt. A pair of lead straps electrically connect the second ends to the power supply unit. Each lead strap extends from the distal end of the corresponding to the shape of a portion of the second bracket that lies in its path. Each lead strap is also a thin belt.

26 Claims, 10 Drawing Sheets

NON-CONTACT POWER SUPPLY FOR CONVEYOR CARRIAGES

BACKGROUND OF THE INVENTION

The present invention relates to a non-contact power supply systems that supply electric power to movable bodies on rails thereby enabling the movable bodies to run on the rails.

Monorail type transfer systems are used in factories and warehouses. Such systems include a movable body, or a carriage, that conveys loads along a rail laid on a ceiling. The carriage also loads and unloads the loads at stations provided along the rail. FIGS. 9 and 10 show a system for supplying electricity to such a carriage. The system includes a power cable 102 that is located along a rail 101, on which a carriage moves. As shown in FIG. 10, the power cable 102 has a circular cross-section. The rail 101 is formed, for example, as an endless loop. This construction allows the carriage to circulate along the rail 101. The power cable 102 is a single wire that is folded at a folded part 102a to form an upper portion and a lower portion extending parallel on the rail 101. Both ends of the power cable 102 are attached to a power supply unit 108.

Brackets 104 are located on the rail 101 at predetermined intervals. Each bracket 104 has upper and lower hangers 105 projecting horizontally. The power cable 102 is supported on the distal ends of the hangers 105. A pickup unit 103 mounted on the carriage faces the cable 102 without contacting the cable 102. The pickup unit 103 generates induced electromotive force based on electrical current through the power cable 102 and supplies electricity based on the generated induced electromotive force to the carriage. The carriage moves using the electricity.

In order to allow the carriage to circulate on the loop rail 101, the folded part 102a of the power cable 102 must not contact the pickup unit 103. Thus, the folded part 102a is secured to the rail 101 by, for example, a fixing member 106. The end portions of the power cable 102 are routed away from the loop rail 101 and are connected to the power supply unit 108. These end portions also must not contact the pickup unit 103.

However, when the carriage passes by a gap between the folded part 102a and the end portions of the power cables 102, the pickup unit 13 generates lower electromotive force. This may hinder the movement of the carriage.

It is preferable to use a pickup unit 107 illustrated by a long and short dashed line in FIG. 10 to increase the generated electromotive force. The pickup unit 107 has an E-shaped cross section and is preferably located as close as possible to the power cable 102 in a surrounding manner for increasing the electromotive force. However, simply securing the folded part 102a of the power cable 102 to the rail 101 does not prevent the part 102a of the cable 102 from interfering with the pickup unit 107. Likewise, it is difficult to route the end portions of the cable 102 from the rail 101 and connect them to the power supply unit 108 without causing the end portions of the cable 102 to interfere with the E-shaped pickup unit 107.

SUMMARY OF THE INVENTION

Accordingly, it is an objective of the present invention to provide a simply constructed non-contact power supply system that positively prevents a power cable from interfering with a pickup unit of a movable body.

To achieve the above objective, the present invention provides a non-contact power supply system for supplying electric power from a power source to a carriage that travels along a rail. The system includes a pair of cables extending parallel along the rail. The cables are used to convey electric power that drives the carriage. Each cable has a first end connected to the first end of the other cable and a second end connected to the power source. A plurality of support members is provided on the rail to support both cables along the rail. Each support member has a pair of projecting hangers. Each hanger has a distal end for supporting a corresponding one of the cables. The support members include at least a first type of support member that supports the first ends of both cables. A thin, conductive jumper strap electrically connects the first ends of both cables to each other. The jumper strap extends between the distal ends of both hangers while conforming to the shape of a portion of the first support member that lies between the distal ends of the hangers.

In another aspect of the present invention, the support members may include at least a second type of support member that supports the second ends of both cables. A pair of thin, conductive lead straps electrically connect the second ends of both cables, respectively, to the power source. Each lead strap extends from the distal end of the corresponding hanger to the power source while conforming to the shape of a portion of the second support member that lies in the path of the lead strap.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A non-contact power supply system according to a first embodiment of the present invention will now be described with reference to FIGS. 1–5.

Figure 1:
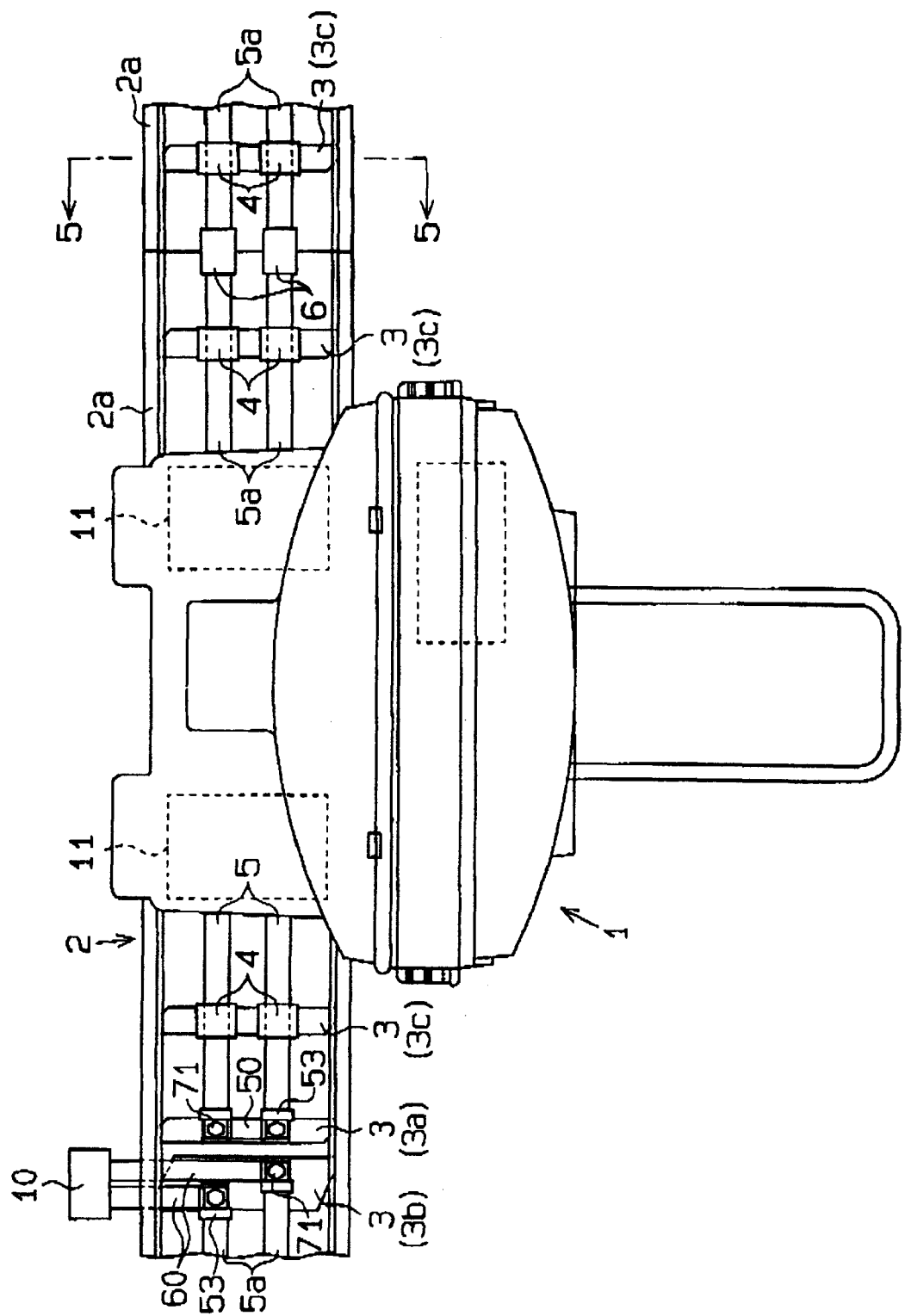
FIG. 1 is a front view illustrating a non-contact power supply system according to a first embodiment of the present invention.

As shown in FIG. 1, a carriage 1 is hung from and runs along a suspended rail 2. Upper and lower power cables 5 are laid on the rail 2. The upper and lower cables 5 runs parallel, that is, a predetermined space exits between the upper cable 5 and the lower cable 5. The power cables 5 are supported by brackets 3 on the rail 2. The rail 2 is constituted by rail segments 2a, each of which has a predetermined length. In this embodiment, the rail 2 is formed in an endless loop.

The power cables 5 are divided into cable segments 5a, each pair of which corresponds to one of the rail segments 2a. When installing the rail 2, a pair of upper and lower cable segments 5a are attached to each rail segment 2a. The rail segments 2a are then assembled at an elevated location such as a ceiling. At the same time, the cable segments 5a on each rail segments 2a are coupled to the cable segments 5a of the adjacent rail segments 2a by hollow cylindrical coupler 6. When coupling the cable segments 5a to one another, an insulating coat is removed from the ends of the cable segments 5a. The ends of the segments 5a are then inserted into the couplers 6. Thereafter, both ends of the couplers 6 are crimped to form an electrical connection. The couplers 6 are then covered by rubber caps or ceramic caps for insulation.

Figure 3:
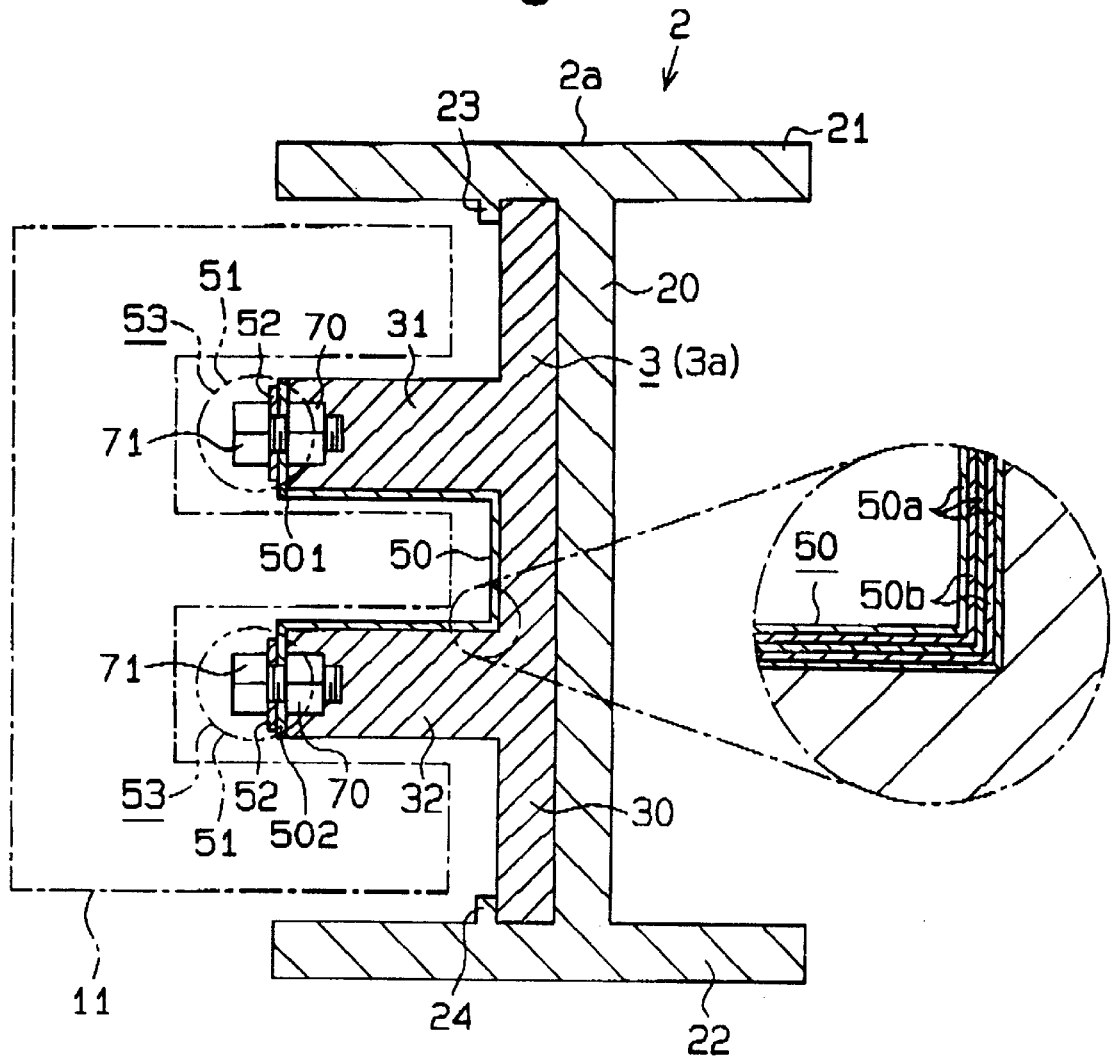
FIG. 3 is a cross-sectional view taken along line 3—3 of FIG. 2.

As illustrated in FIG. 3, each rail segment 2a has an I-shaped cross section. Specifically, the rail segment 2a has upper and lower horizontal walls 21, 22 and a vertical wall 20 that couples the horizontal walls 21, 22 with each other. A projection 23 is formed on the lower side of the upper wall 21 and extends in the longitudinal direction of the rail segment 2a. The projection 23 is parallel to the vertical wall 20. Likewise, a projection 24 is formed on the upper side of the lower wall 22 and extends in the longitudinal direction of the rail segment 2a. The projection 24 faces the projection 23 and is parallel to the vertical wall 20.

Figure 2:
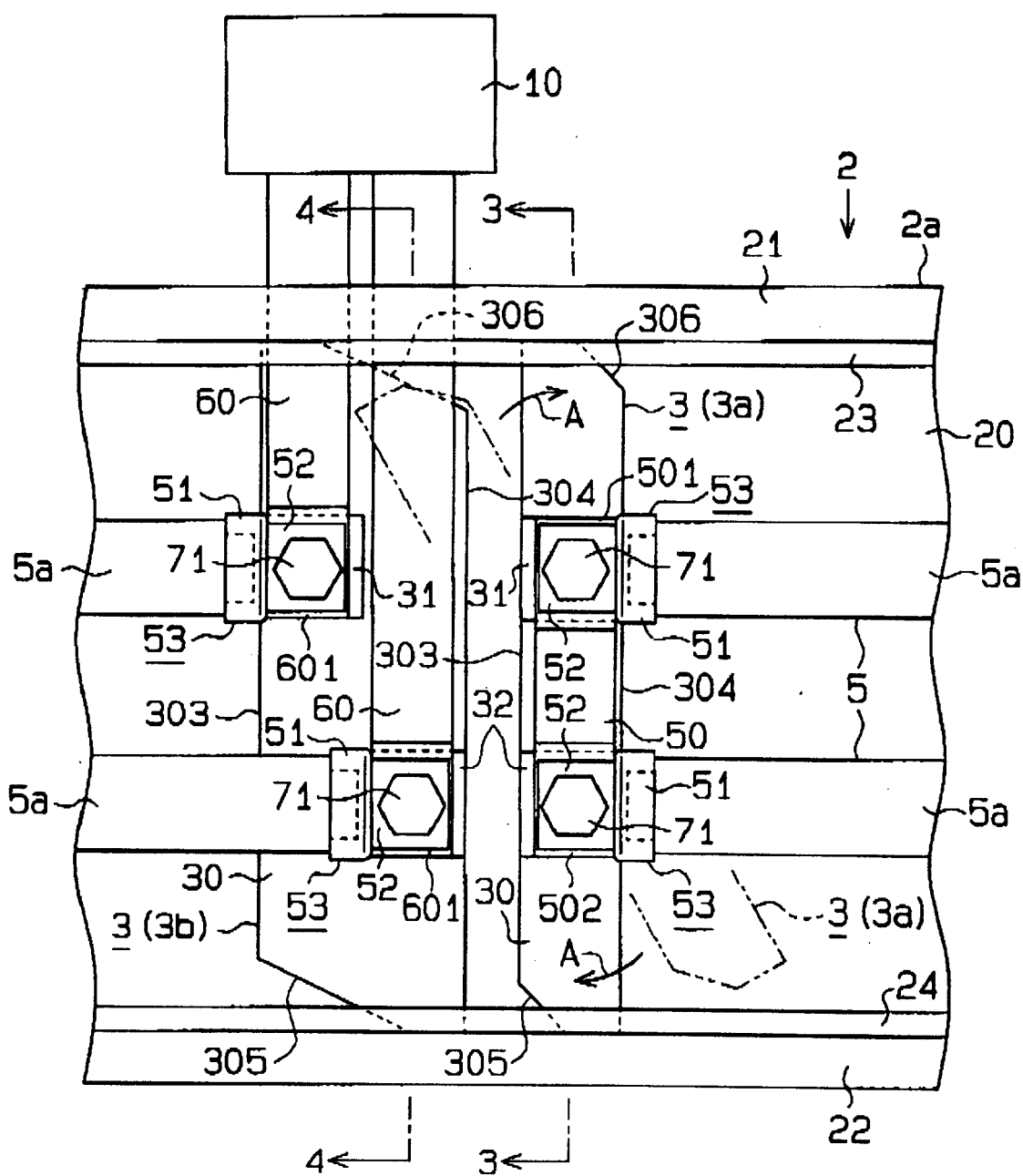
FIG. 2 is an enlarged partial front view of the power supply system of FIG. 1.

The brackets 3 for supporting the power cables 5 are located on each rail segments 2a with a predetermined distance between each adjacent pair of the brackets 3. As shown in FIGS. 2 to 5, each bracket 3 includes a rectangular base 30 and upper and lower hangers 31, 32 protruding laterally from the base 30. The power cables 5 are supported on the distal ends of the hangers 31, 32. As shown in FIG. 2, the base 30 has a chamfer 305 defined at the lower end of a side 303. The base 30 has another chamfer 306 at the upper end of the opposite side 304. When attaching the bracket 3 to the rail segment 2a, the bracket 3 is placed on the vertical wall 20 in a slanted manner as illustrated by a double dashed chain line in FIG. 2. Then, the bracket 3 is then rotated in the direction of arrow A. This detachably secures the bracket 3 between the vertical wall 20 and the projections 23, 24.

As shown in FIG. 1, the brackets 3 include a first bracket 3a for supporting first ends of the power cables 5, a second bracket 3b for supporting second ends of the cables 5 and third brackets 3c supporting intermediate portions of the power cables 5. The first ends of the cables 5 are electrically connected to each other by a jumper strap 50. The second ends of the power cable 5 are connected to a power supply unit 10 by lead straps 60. Therefore, the jumper strap 50 and the lead straps 60 cause the power cables 5 to form an electrically continuous single cable, or circuit, both ends of which are connected to the power supply unit 10.

Figure 5:
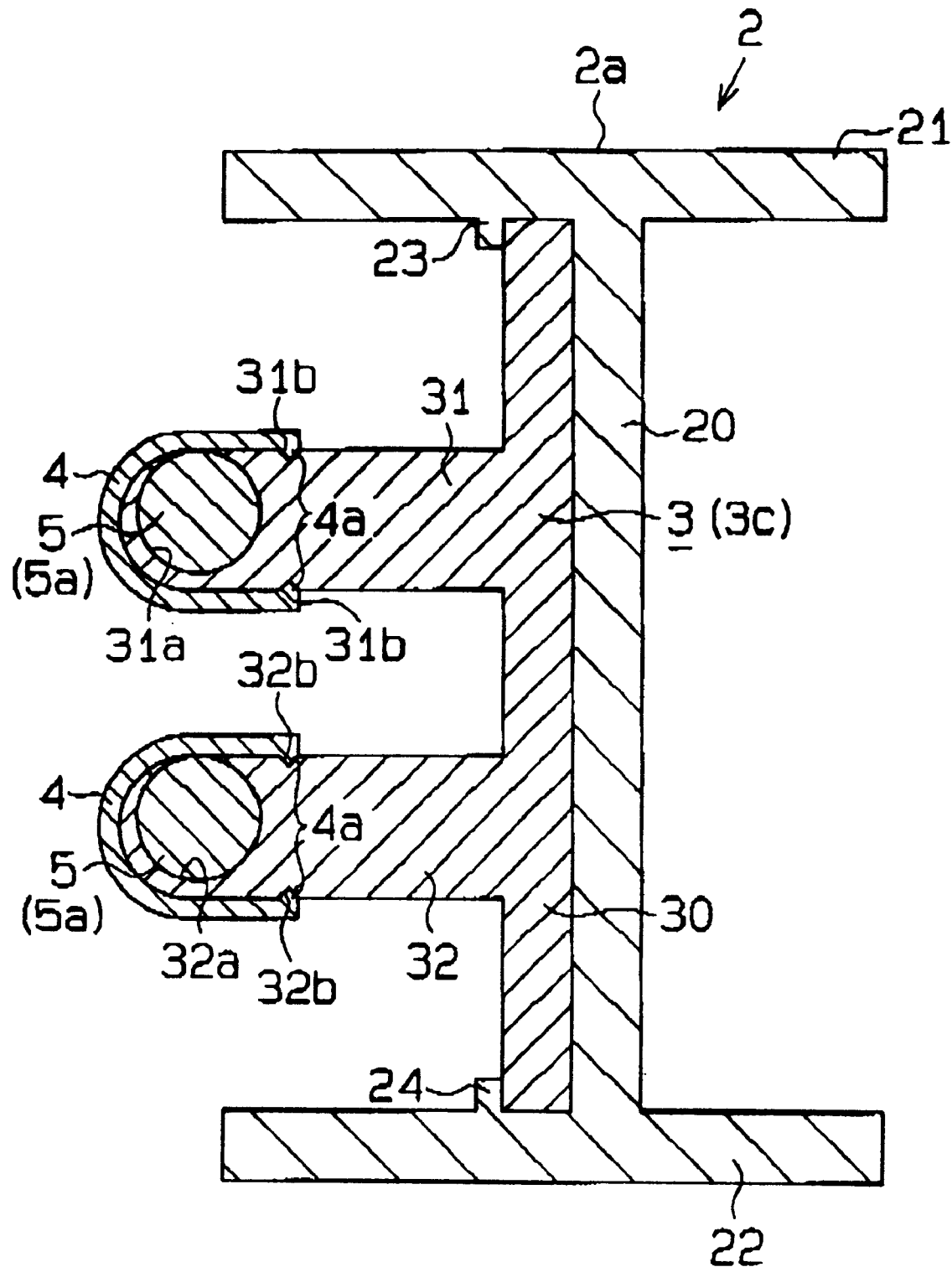
FIG. 5 is a cross-sectional view taken along line 5—5 of FIG. 1.

FIG. 5 is a cross-sectional view illustrating one of the third brackets 3c. The hangers 31, 32 of the bracket 3c have a circular recess 31a, 32a for holding the power cables 5, respectively. A cover 4, which has a substantially U-shaped cross section, covers the distal end of each hanger 31, 32. Each cover 4 has claws 4a at the open end. Each hanger 31, 32 has grooves 31b, 32b formed at positions corresponding to the claws 4a of the covers 4. Engagement of the claws 4a with the grooves 31b, 32b secures the covers 4 on the hangers 31, 32. Accordingly, the cables 5 are securely held in the hangers 31, 32.

As illustrated in FIG. 3, the first bracket 3a has nuts 70 that are embedded in the distal end of the hangers 31, 32. Each power cable 5 has a connector 53 secured to the first end. The connector 53 includes a collar 51 and a lug 52 extending from the collar 51. Insulation is removed from the first ends of the power cables 5. Then, the first ends of the power cables 5 are fitted in the collars 51 of the connectors 53 to form a secure electrical connection. A thin belt-like jumper strap 50 is bent to fit the shape of the first bracket 3a and extends from the distal end of the hanger 31 to the distal end of the hanger 32. As illustrated in the enlarged circle in FIG. 3, the jumper strap 50 includes copper plates 50a and insulating plates 50b, which are alternately layered.

Ends 501 and 502 of the jumper strap 50 are located at the distal ends of the hangers 31, 32, respectively. Then, the lugs 52 of the connectors 53, which are secured to the first ends of the power cables 5, are placed on the ends 501, 502. Bolts 71 are screwed to the nuts 70 embedded in the hangers 31, 32 through the strap 50 and the connectors 53. Thus, the nuts 70 and the bolts 71 define terminals. Accordingly, the first ends of the power cables 5 are secured to the terminals of the first bracket 3a and are electrically connected with each other by the jumper strap 50.

Figure 4:
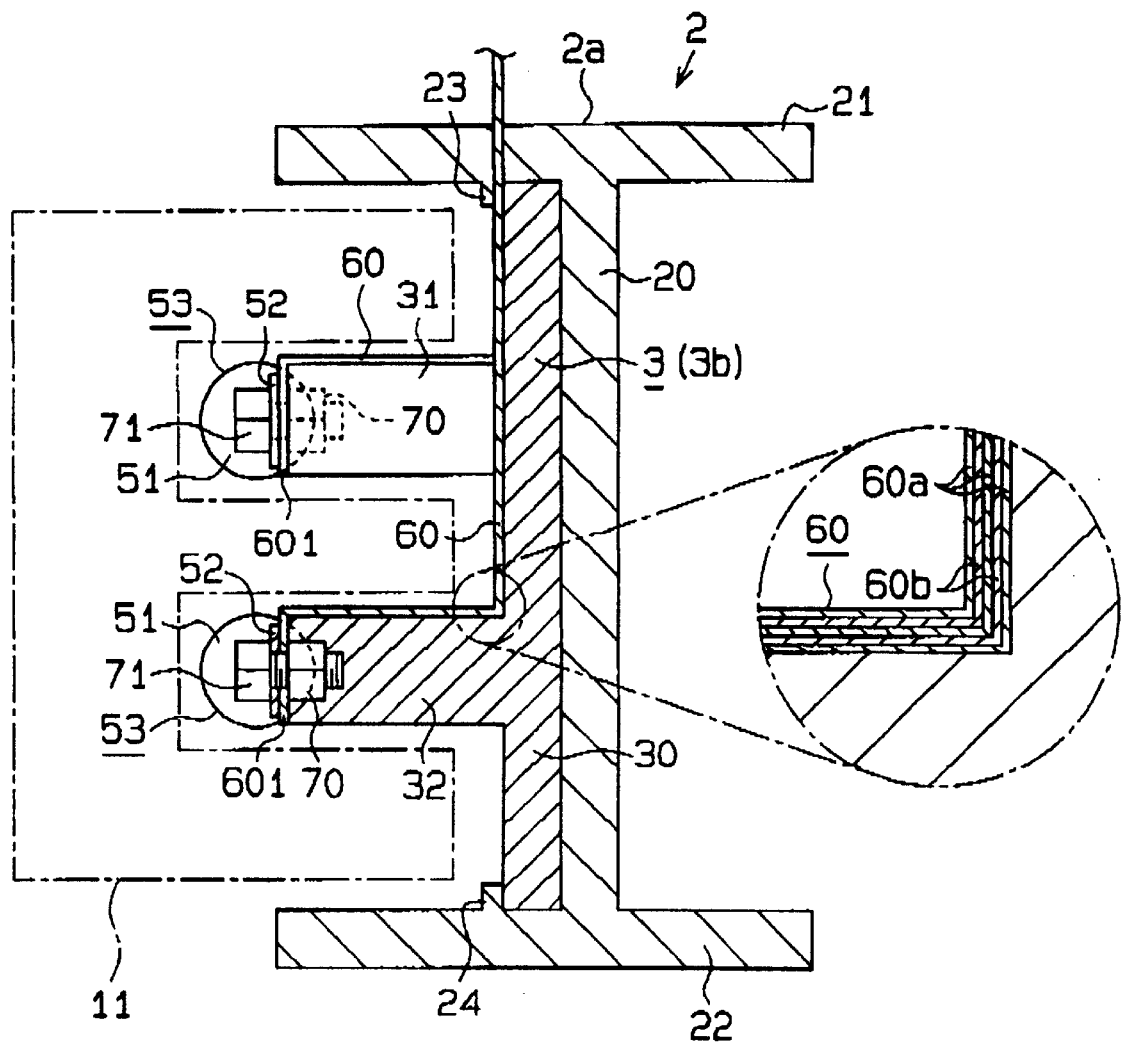
FIG. 4 is a cross-sectional view taken along line 4—4 of FIG. 2.

As shown in FIGS. 2 and 4, the hangers 31 and 32 of the second bracket 3b are offset in the longitudinal direction of the rail 2. As in the first bracket 3a, nuts 70 are embedded in the distal ends of the hangers 31, 32. Connectors 53 are secured to the second ends of the power cables 5. A pair of lead straps 60 are thin and belt-like and are bent to fit the shape of the second bracket 3b. The lead straps 60 extend from terminals on the distal ends of the hangers 31, 32 to the power supply unit 10 through the upper wall 21 of the rail segment 2a. Like the jumper strap 50, the lead straps 60 include copper plates 60a and insulating plates 60b alternately layers as illustrated in the enlarged circle in FIG. 4.

Ends 601 of the lead straps 60 are locked on the distal ends of the hangers 31, 32. Then, the lugs 52 of the connectors 53, which are secured to the second ends of the power cables 5, are placed on the ends 601. Bolts 71 are screwed to the nuts 70 embedded in the distal ends of the hangers 31, 32 through the lead straps 60 and the connectors 53. Thus, the nuts 70 and the bolts 71 define terminals. Accordingly, the second ends of the power cables 5 are secured to the terminals of the second bracket 3b and are electrically connected with the power supply unit 10 by the lead straps 60.

As shown in FIGS. 1 and 3, the carriage 1 has a pair of pickup units 11. Each pickup unit 11 has a substantially E-shaped cross section and faces the power cables 5 without contacting the cables 5. In other words, the pickup units 11 straddle the hangers 31, 32. The pickup units 11 generate induced electromotive force based on a high frequency current in the power cables 5 and supplies electricity based on the generated electromotive force to the carriage 1 for moving the carriage 1. The E-shaped cross section allows the pickup units 11 to be located very close to the power cables 5 in a surrounding manner. This construction allows the pickup units 11 to effectively generate induced electromotive force based on the current in the power cables 5.

In the above described non-contact power supply system, the first ends of the power cables 5 are connected to each other by the thin jumper strap 50, which is bent to fit the shape of a portion of the first bracket 3a. Further, the second ends of the power cables 5 are connected to the power supply unit 10 by the thin lead straps 60, which are bent to fit a portion of the shape of the second bracket 3b. Therefore, even if the pickup units 11 on the carriage are located very close to the power cables 5, the jumper strap 50 and the lead straps 60 do not interfere with the pickup units 11. Being constituted by thin conductor straps, the jumper strap 50 and the lead straps 60 are easily bent to fit the shape of the first bracket 3a and the second bracket 3a. The broad sides of straps 50, 60 face the brackets 3a, 3b, respectively, so that the straps 50, 60 do not project significantly toward the pickup unit 11.

The first ends of the power cables 5 and the jumper strap 50 are secured to the hangers 31, 32 of the first bracket 3aby the bolts 71. The power cables 5 and the jumper strap 50 therefore can be easily attached to and be detached from the first bracket 3a. Also, the power cables 5 can be easily connected to and be separated from the jumper strap 50. The second ends of the power cables 5 and the lead straps 60 are secured to the hangers 31, 32 of the second bracket 3b by the bolts 71. The power cables 5 and the lead straps 60.

High frequency current from the power supply unit 10 flows near the surface of a conductor because of the skin effect. Therefore, even if a conductor having a large cross-sectional area is used for high frequency current, the effective area through which the current actually flows is small. However, the jumper strap 50 and the lead straps 60 include the thin copper plates 50a, 60a and the insulating plates 50b, 60b, which are alternately layered. Thus, the high frequency current is divided to pass through the copper plates 50a, 60a. This reduces the skin effect, that is, it enlarges the effective area through which the current flows. As a result, energy losses are reduced. This construction thus enables the power supply unit 10 to supply a great amount of electric current to the cables 5.

The rail 2 is constituted by multiple rail segments 2a. The power cables 5 are divided into multiple pairs of cable segments 5a, each of which corresponds to one of the rail segments 2a. This construction facilitates lifting and installing of the rail 2 and the power cables 5 at an elevated location. The construction also facilitates changes in the layout of the power supply system.

When installing the power supply system, the rail segments 2a, to which the pair of the cable segments 5a have previously been attached, are coupled with one another at an elevated location such as a ceiling. At the same time, the cable segments 5a on each rail segment 2a are connected to the cable segments 5a on the adjacent rail segments 2a by the couplers 6. This method further facilitates the installation of the power supply system.

The couplers 6 are hollow cylinders and therefore have a simple construction. Adjacent aligned pairs of the power cable segments 5a are inserted into opposite ends of the coupler 6. The coupler 6 is then crimped. In this manner, the cable segments 5a are easily coupled to each other.

In this embodiment, the carriage 1 is located on and circulates about the loop rail 2, which is endless. The jumper strap 50 is perpendicular to the power cables 5, as seen in FIG. 2. Likewise, the lead straps 60 are perpendicular to the power cables 5, as seen in FIG. 2. This construction minimizes the distance between the first ends and the second ends of the power cables 5. Therefore, when one of the pickup units 11 of the carriage 1 passes by the gap between the first ends and the second ends of the power cables 5, the pickup unit 11 continues generating induced electromotive force. In other words, passing by the gap between the first and second ends of the power cables 5 does not hinder the movement of the carriage 1.

The lead straps 60 extend upward from the second ends of the power cables 5 while conforming to the shape of a portion of the second bracket 3b. The lead straps 60 also extend through the horizontal upper wall 21 of the rail segment 2a and are connected to the power supply unit 10. Therefore, even if the rail 2 is formed in an endless loop, as in the above embodiment, the lead straps 60 cannot interfere with the pickup units 11 on the carriage 1. The construction of the lead straps 60 also allows high frequency current from the power supply unit 10 to be easily and securely supplied to the power cables 5.

The rail 2 is not necessarily formed as an endless loop. If the rail 2 is not formed as an endless loop, the jumper strap 50 and the lead straps 60 are located at the opposite ends of the rail 2, respectively. The jumper strap 50 and the lead straps 60 will not significantly protrude laterally from the rail 2 at the ends of the rail 2. Therefore, even if the pickup unit 11 is located very close to the jumper strap 50 or to the lead straps 60, the pickup unit 11 continues to generate induced electromagnetic force. This embodiment therefore maximizes the moving range of the carriage 1 while minimizing the length of the power supply system. In other words, this embodiment minimizes the size of the power supply system.

Figure 6:
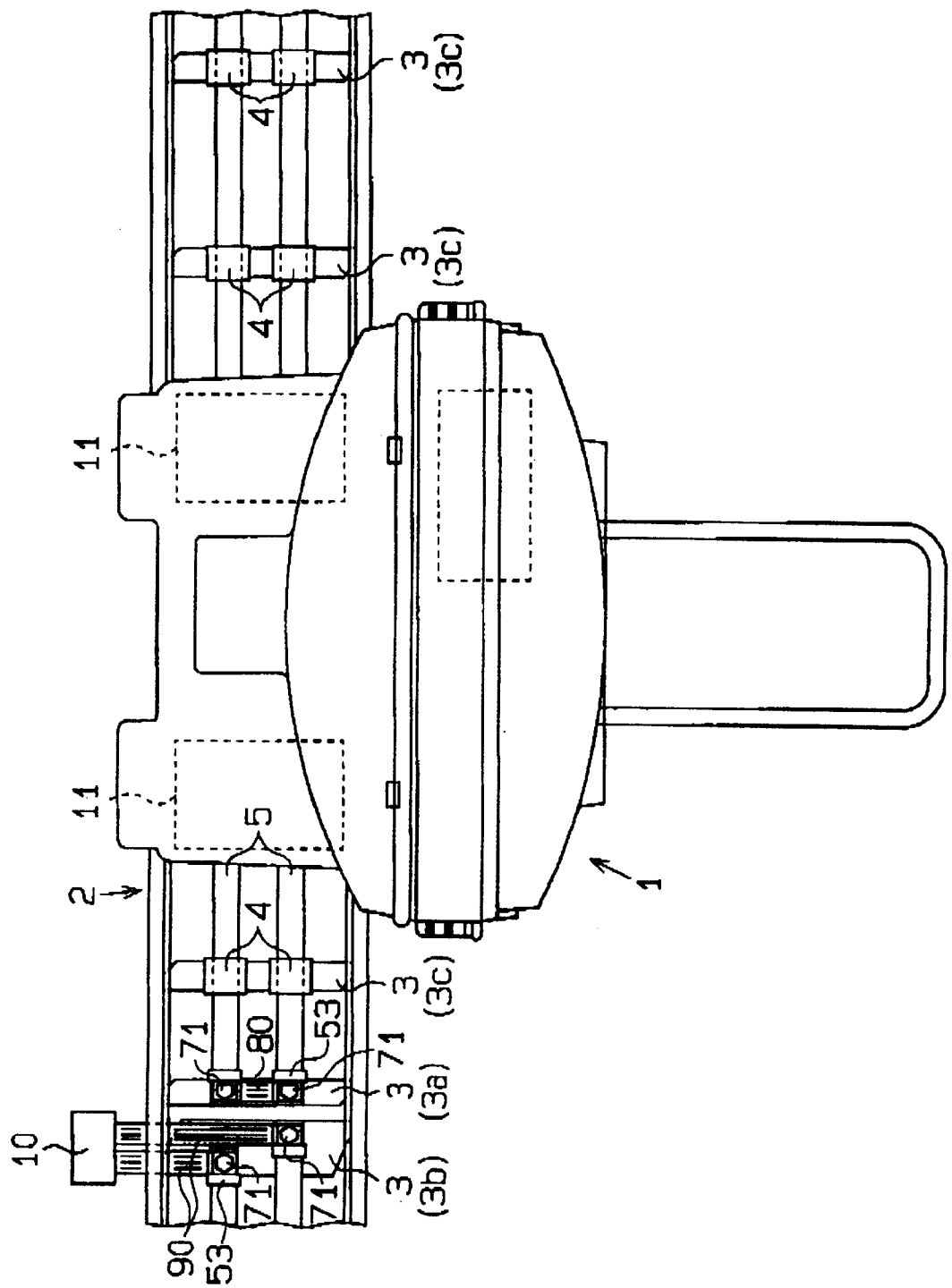
FIG. 6 is a front view illustrating a non-contact power supply system according to a second embodiment of the present invention.
Figure 7:
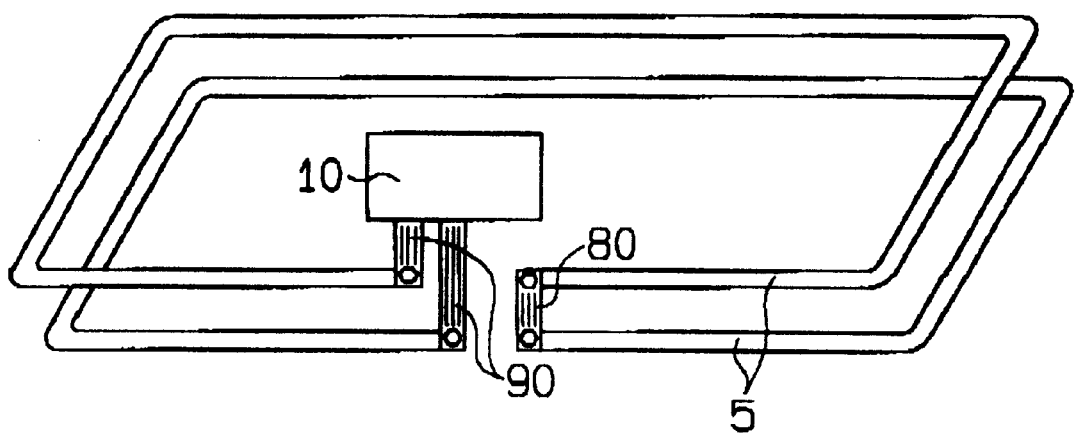
FIG. 7 is diagrammatic perspective view illustrating the power supply system of FIG. 6.

A second embodiment of the present invention will now be described with reference to FIGS. 6 and 7. The differences from the first embodiment will mainly be discussed below.

In the first embodiment, a pair of power cables 5 are constituted by coupling multiple cable segments 5a. However, in this embodiment, each power cable 5 is constituted by a continuous single wire as illustrated in FIGS. 6 and 7. The first ends of the power cables 5 are coupled to each other by a jumper strap 80, which is a flattened wire. The second ends of the power cables 5 are connected to the power supply unit 10 by lead straps 90, which are also flattened wires. Each power cable 5 includes bundled copper wires covered by an insulating coating and each has a circular cross section. The jumper strap 80 and the lead straps 90 are formed by cables that have substantially the same structure as the power cables 5. Specifically, cables having substantially the same structure as the power cables 5 are flattened to form the jumper strap 80 and the lead straps 90.

Lug connectors may be connected to the ends of the jumper strap 90 and to the lower ends of the lead straps 90. In this case, the connectors 53 at the ends of the power cables 5 are placed on the lug connectors of the jumper strap 80 and the lead straps 90 and are fastened to the brackets 3a and 3b by the bolts 71. Alternatively, the insulating coating at the ends of the jumper strap 80 and at the lower ends of the lead straps 90 may be removed. The connectors 53 of the power cables 5 are then placed on the bare ends of the jumper strap 80 and the lead straps 90 and are fastened to the brackets 3a, 3b by the bolts 71.

In this embodiment, the power cables 5 are connected to each other by the jumper strap 80. Therefore, the power cables 5 can be separately installed to an elevated location such as a ceiling. Compared to the prior art, in which a single continuous power cable is elevated to a position such as a ceiling and is installed, the installation of the power cables 5 according to this embodiment is easier. This embodiment thus facilitates the installation of the power supply system.

In this embodiment, the jumper strap 80 and the lead straps 90 are flattened wires. Therefore, the jumper strap 80 and the lead straps 90 are easy to bend to fit the shape of the relevant portions of the first bracket 3*a* and the second bracket 3*b*. Thus, this embodiment has the same advantages as the first embodiment.

A third embodiment of the present invention will now be described with reference to FIG. 8. The differences from the first embodiment will mainly be discussed below.

In the first embodiment, the carriage 1 is located on the same side of the vertical wall 20 as the power cables 5. However, in this embodiment, the carriage 1 is located on the opposite side of the vertical wall 20 from the power cables 5, as illustrated in FIG. 8. In this manner, the location of the carriage 1 in relation to the rail 2 is not limited.

Figure 8:
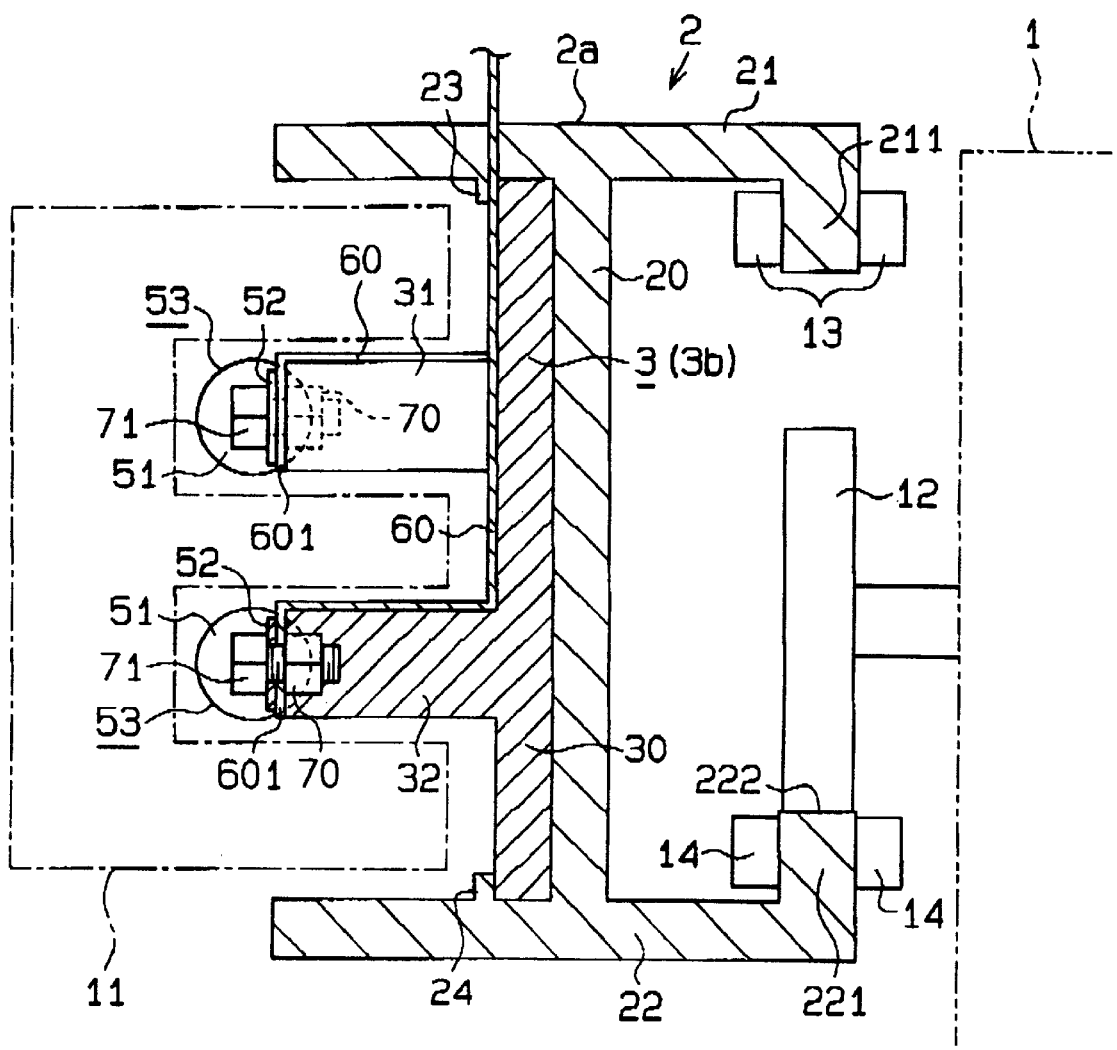
FIG. 8 is a cross-sectional side view illustrating a non-contact power supply system according to a third embodiment of the present invention.
Figure 9:
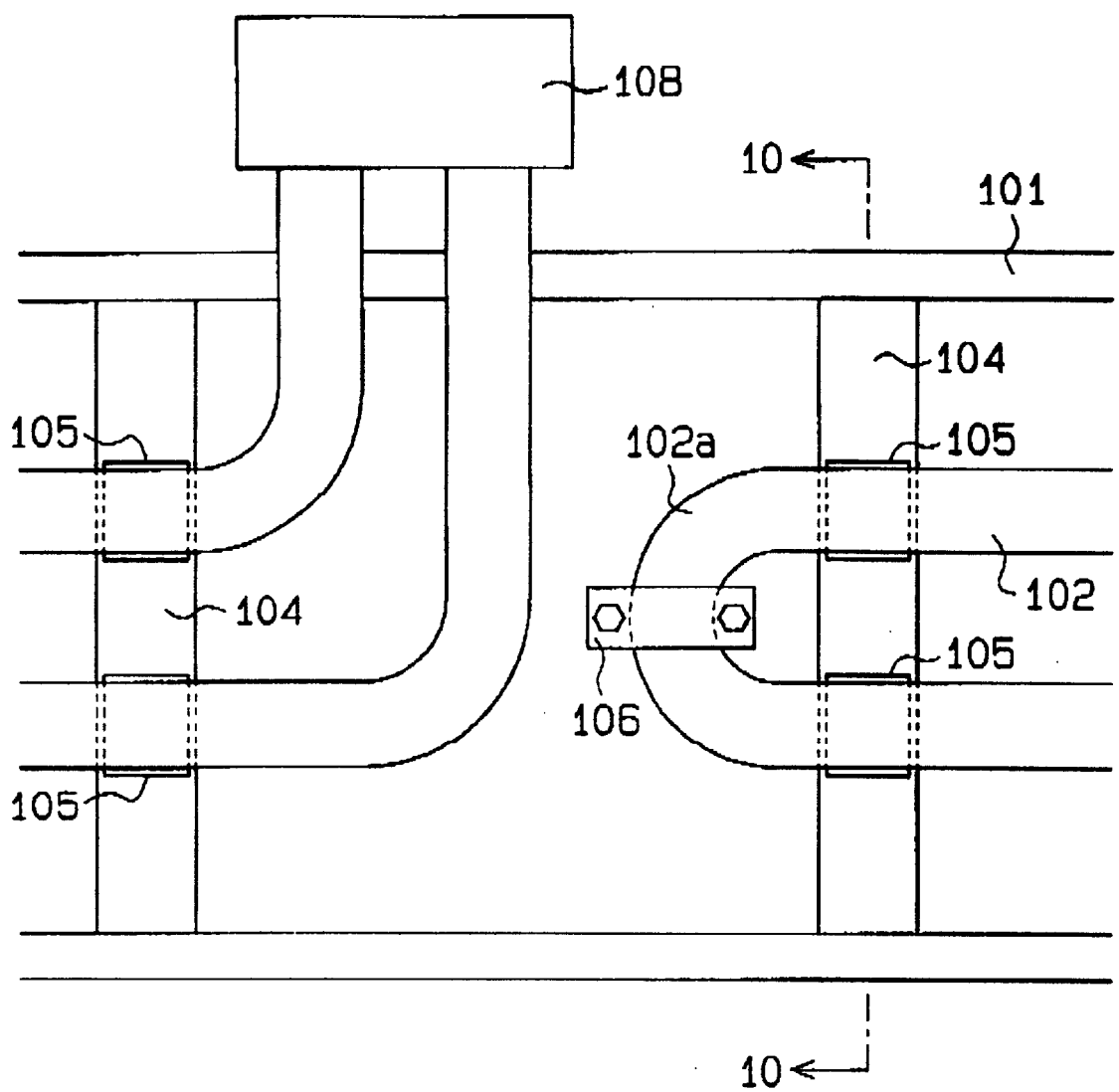
FIG. 9 is a front view illustrating a prior art non-contact power supply system.
Figure 10:
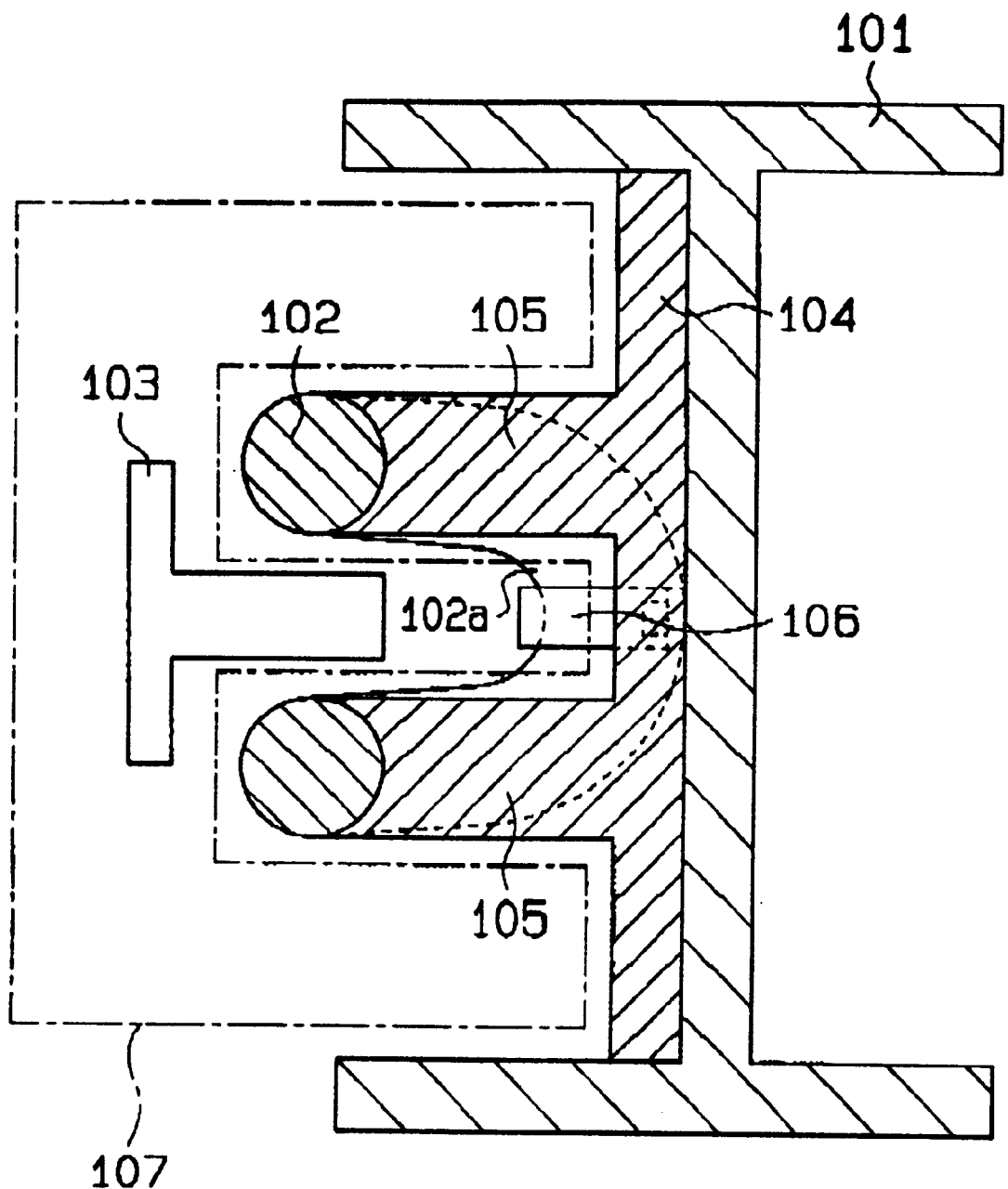
FIG. 10 is a cross-sectional view taken along line 10—10 of FIG. 9.

As viewed in FIG. 8, the power cables 5 are located on the left side of the vertical wall 20, and an upper guide 211 protrudes downward from the upper horizontal wall 21 on the right side of the vertical wall 20. Likewise, a lower guide 221 protrudes upward from the lower horizontal wall 22 on the side of the vertical wall 20 that is opposite to the power cables 5. The guides 211 and 221 extend along the longitudinal direction of the corresponding rail segment 2*a*. The lower guide 221 has a roller surface 222 along which a driving wheel 12 of the carriage 1 rolls.

The upper guide 211 is held by pairs of upper guide rollers 13 of the carriage 1. In the same manner, the lower guide 221 is held by pairs of lower guide rollers 14 of the carriage 1. In other words, the carriage 1 is guided on the rail 2 by the guide rollers 13, 14 and is supported and moved along the rail 2 by the driving wheel 12. The carriage 1 is electrically and mechanically connected to the pickup unit 11 located at the opposite side of the rail 2 by a connecting member. The connecting member (not shown) is located below the rail 2 so that it does not interfere with the lead straps 60 extending upward from the upper wall 21 of the rail 2.

The carriage 1 has a several sensors (not shown) such as a magnetic sensor for detecting its position on the rail 2. These sensors are likely to be affected by electromagnetic noise generated by high frequency current flowing in the power cables 5. The noise may cause the sensors to malfunction thereby hindering the movement of the carriage 1.

However, in this embodiment, the carriage 1 is located at the opposite side of the vertical wall 20 with respect to the power cables 5. This construction maximizes the distance between the carriage 1 and the power cables 5 thereby preventing the sensors from being affected by electromagnetic noise generated by current in the cables 5.

It should be apparent to those skilled in the art that the present invention may be embodied in many other specific forms without departing from the spirit or scope of the invention. Particularly, it should be understood that the invention may be embodied in the following forms.

In the first embodiment, the number of the layers of the thine copper plates 50*a*, 60*b* and the number of the insulating plates 50*b*, 60*b* may be changed.

Each of the jumper straps 50, 80 and the lead straps 60, 90 may be constituted by a single plate made of conducting material such as copper. This simplifies manufacturing and lowers the cost.

If the power supply 10 is located below the rail 2, the lead straps 60, 90 may extend through and downward from the lower wall 22 rather than through and above the upper wall 21.

The second bracket 3*b* may be divided into two separate parts. In this case, one part includes the hanger 31 for supporting the second end of the upper power cable 5 whereas the other part includes the hanger 32 for supporting the second end of the lower power cable 5.

In the third embodiment, the carriage 1 may be located on the same side of the rail 2 as the power cables 5 as shown in FIG. 1, and only the driving wheel 12 and the guide rollers 13, 14 may be located on the opposite side of the vertical wall 20 from the power cables 5.

Therefore, the present examples and embodiments are to be considered as illustrative and not restrictive and the invention is not to be limited to the details given herein, but may be modified within the scope and equivalence of the appended claims.

What is claimed is:

1. A non-contact power supply system for supplying electric power from a power source to a carriage that travels along a rail, the system comprising:

a pair of cables extending parallel along the rail, wherein the cables are used to convey electric power that drives the carriage, wherein each cable has a first and connected to the first end of the other cable and a second end connected to the power source;

a plurality of support members provided on the rail to support both cables along the rail, wherein each support member has a pair of projecting hangers, wherein each hanger has a distal end for supporting a corresponding one of the cables, wherein the support members include at least a first type of support members that supports the first ends of both cables; and a thin, conductive jumper strap for electrically connecting the first ends of both cables to each other, wherein the jumper strap extends between the distal ends of both hangers while conforming to the shape of a portion of the first support member that lies between the distal ends of the hangers.

2. The system according to claim 1, wherein the jumper strap includes alternately layered conducting plates and insulating plates.

3. The system according to claim 1, wherein the jumper strap is a flattened wire.

4. The system according to claim 1 further comprising a terminal for removably attaching the first end of each cable and an end of the jumper strap to the distal end of the corresponding hanger.

5. The system according to claim 4, wherein the terminal includes a nut fixed to the distal end of each hanger and bolt screwed to the nut.

6. A non-contact power supply system for supplying electric power from a power source to a carriage that travels along a rail, the system comprising:

a pair of cables extending parallel along the rail, wherein the cables are used to convey electric power that drives the carriage, wherein each cable has a first end connected to the first end of the other cable and a second end connected to the power source;

a plurality of support members provided on the rail to support both cables along the rail, wherein each support member has a pair of projecting hangers, wherein each hanger has a distal end for supporting corresponding one of the cables, wherein the support members include at least a second type of support member that supports the second ends of both cables; and a pair of thin, conductive lead straps for electrically connecting the second ends of both cables, respectively, to the power source, wherein each lead strap extends from the distal end of the corresponding hanger to the power source while conforming to the shape of a portion of the second support member that lies in the path of the lead strap.

7. The system according to claim 6, wherein each lead strap includes a alternately layered conducting plates and insulating plates.

8. The system according to claim 6, wherein each lead strap is a flattened wire.

9. The system according to claim 6 further comprising a terminal for removably attaching the second end of each cable and an end of each lead strap to the distal end of the corresponding hanger.

10. The system according to claim 9, wherein the terminal includes a nut fixed to the distal end of each hanger and a bolt screwed to the nut.

11. The system according to claim 6, wherein the rail has an upper horizontal wall, a lower horizontal wall parallel to the upper horizontal wall, and a vertical wall coupling the horizontal walls to each other, wherein the hangers of each supporting member are vertically separated from each other and project horizontally.

12. The system according to claim 11, wherein each lead strap extends substantially vertically from the distal end of the corresponding hanger of the second supporting member to the power source through one of the upper and lower horizontal walls.

13. The system according to claim 1, wherein the rail includes a plurality rail elements, which have a certain length, connected one another, and wherein each cable is divided into a plurality of cable elements, each of which corresponds to one of the rail elements.

14. The system according to claim 1, wherein the carriage has a pickup, which has substantially E-shaped cross section, facing and partially surrounding the cables without contacting the cables, wherein the pickup generates induced electromotive force based on electric current in the cables and supplies the electromotive force to the carriage for moving the carriage.

15. The system according to claim 1, wherein the carriage is located on the opposite side of the rail from the cables.

16. The system according to claim 1, wherein the carriage has a drive roller, and wherein the rail has a roller surface along which the drive roller moves, wherein the roller surface is located on the opposite side of the rail from the cables.

17. The system according to claim 1, wherein the rail is formed in an endless loop, wherein the first ends of the cables are close to the second ends of the cables.

18. A non-contact power supply system for supplying electric power from a power source to a carriage that travels along a rail, the system comprising:

a pair of cables extending parallel along the rail, wherein the cables are used to convey electric power that drives the carriage, wherein each cable has a first end connected to the first end of the other cable and a second end connected to the power source;

a pickup provided on the carriage to face the cables without contacting the cables, wherein the pickup generates induced electromotive force based on electric power in the cables and supplies the electromotive force to the carriage for moving the carriage;

a plurality of support members provided on the rail to support both cables along the rail, wherein each support member has a pair of horizontally projecting hangers, which are vertically separated from each other, wherein the hangers each have distal ends for supporting the corresponding cables, wherein the support members include at least a first type of support member for supporting the first ends of both cables and a second type of support member for supporting the second ends of both cables;

a thin, conductive jumper strap for electrically connecting the first ends of both cables to each other, wherein the jumper strap extends between the distal ends of both hangers while conforming to the shape of a portion of the first support member that lies between the distal ends of the hangers; and a pair of thin, conductive lead straps for electrically connecting the second ends of both cables, respectively, to the power source, wherein each lead strap extends from the distal end of the corresponding hanger to the power source while conforming to the shape of a portion of the second support member that lies in the path of the lead strap.

19. The system according to claim 18 further comprising:

a first terminal for removably attaching the first end of each cable and an end of the jumper strap to the distal end of the corresponding hanger; and a second terminal for removably attaching the second end of each cable and an end of each lead strap to the distal end of the corresponding hanger.

20. The system according to claim 19, wherein the jumper strap and the lead straps each include alternately layered conducting plates and insulating plates.

21. The system according to claim 19, wherein the jumper strap and the lead straps are each flattened wires.

22. The system according to claim 19, wherein the rail has an upper horizontal wall, a lower horizontal wall parallel to the upper horizontal wall, and a vertical wall coupling the horizontal walls to each other, wherein each lead strap extends substantially vertically from the distal end of the corresponding hanger of the second supporting member to the power source through one of the upper and lower horizontal walls.

23. The system according to claim 19, wherein the rail is formed in an endless loop, wherein the first ends of the cables are close to the second ends of the cables.

24. The system according to claim 19, wherein the pickup has substantially E-shaped cross section to partially surround the cables.

25. The system according to claim 19, wherein the carriage is located on the opposite side of the rail from the cables.

26. The system according to claim 22, wherein the carriage has a drive roller, and wherein the lower horizontal wall has a roller surface along which the drive roller moves, wherein the roller surface is located on the opposite side of the vertical wall from the cables.

* * * * *